United States Patent
Lemos Alvares Dos Santos et al.

(10) Patent No.: US 12,546,936 B2
(45) Date of Patent: Feb. 10, 2026

(54) STRUCTURE FOR A PHOTONIC INTEGRATED CIRCUIT

(71) Applicant: SMART Photonics Holding B.V., Eindhoven (NL)

(72) Inventors: Rui Manuel Lemos Alvares Dos Santos, Eindhoven (NL); Steven Everard Filippus Kleijn, Eindhoven (NL); Petrus Johannes Adrianus Thijs, Eindhoven (NL)

(73) Assignee: SMART Photonics Holding B.V., Eindhoven (NL)

( * ) Notice: Subject to any disclaimer, the term of this patent is extended or adjusted under 35 U.S.C. 154(b) by 259 days.

(21) Appl. No.: 17/876,609

(22) Filed: Jul. 29, 2022

(65) Prior Publication Data

US 2022/0365276 A1    Nov. 17, 2022

Related U.S. Application Data

(63) Continuation of application No. PCT/EP2021/052198, filed on Jan. 29, 2021.

(30) Foreign Application Priority Data

Jan. 31, 2020 (GB) ..................................... 2001404

(51) Int. Cl.
*G02B 6/12* (2006.01)
*G02B 6/42* (2006.01)
(Continued)

(52) U.S. Cl.
CPC ........... *G02B 6/12004* (2013.01); *G02B 6/43* (2013.01); *G02B 2006/12078* (2013.01);
(Continued)

(58) Field of Classification Search
CPC .............................. G02B 6/12004; G02B 6/43
See application file for complete search history.

(56) References Cited

U.S. PATENT DOCUMENTS 8,948,227 B2 * 2/2015 Margalit ................ B82Y 20/00
372/50.12
2004/0028105 A1 * 2/2004 Peters .................... B82Y 20/00
372/50.1
(Continued)

FOREIGN PATENT DOCUMENTS

JP    2003264334 A    9/2003
JP    200927049 A    2/2009
(Continued)

OTHER PUBLICATIONS

United Kingdom Search Report dated Jun. 22, 2021 for GB Application No. GB2001404.9.
(Continued)

*Primary Examiner* — Thomas A Hollweg
*Assistant Examiner* — Kirsten D. Endresen
(74) *Attorney, Agent, or Firm* — EIP US LLP

(57) ABSTRACT

A structure for a photonic integrated circuit, comprising: a substrate; a first portion of n-type semiconductor material on a first surface area of the substrate, a second portion of n-type semiconductor material on a second surface area of the substrate; a waveguide; and an element between the first portion and the second portion. The waveguide is on and in
(Continued)

contact with the element. The element is configured to reduce electric current flow from the first portion to the second portion during propagation of light via the waveguide.

20 Claims, 8 Drawing Sheets

(51) Int. Cl.
  *G02B 6/43* (2006.01)
  *H10F 30/223* (2025.01)
(52) U.S. Cl.
  CPC .............. *G02B 2006/12123* (2013.01); *G02B 2006/12159* (2013.01); *G02B 6/4274* (2013.01); *H10F 30/223* (2025.01)

(56) References Cited

U.S. PATENT DOCUMENTS

| | | | |
|---|---|---|---|
| 2010/0310256 A1* | 12/2010 | Shpantzer | H04B 10/61 398/74 |
| 2011/0147874 A1 | 6/2011 | Nagarajan et al. | |
| 2022/0334418 A1* | 10/2022 | Bai | G02F 1/025 |

FOREIGN PATENT DOCUMENTS

| | | |
|---|---|---|
| JP | 2015122440 A | 7/2015 |
| KR | 20180085221 A | 7/2018 |

OTHER PUBLICATIONS

International Search report and Written Opinion dated Jun. 9, 2021 for International PCT Application No. PCT/EP2021/052198.
Bowers, John "Trends, Possibilities and Limitations of Silicon Photonic Integrated Circuits and Devices", A Tutorial at the IEEE Custom Integrated Circuits Conference 2013, IEEE, https://ieeexplore.ieee.org/stamp/stamp.jsp?tp=&arnumber=6658508, Sep. 22, 2013.
He et al., "Room temperature direct-bandgap electroluminescence from a horizontal Ge ridge waveguide on Si", Chin. Phys. B, vol. 25, No., 12, 2016, pp. 126104-1 to 126104-14, Oct. 25, 2016.
Japanese Office Action dated Dec. 26, 2024 for Japanese Patent Application No. 2022-543627.
Japanese Decision of Rejection Office Action dated Jul. 14, 2025 for Japanese Patent Application No. 2022-543627.

* cited by examiner

STRUCTURE FOR A PHOTONIC INTEGRATED CIRCUIT

CROSS-REFERENCE TO RELATED APPLICATIONS

This application is a continuation of International Application No. PCT/EP2021/052198, filed Jan. 29, 2021 which claims priority to United Kingdom Application No. GB 2001404.9, filed Jan. 31, 2020, under 35 U.S.C. § 119(a). Each of the above referenced patent applications is incorporated by reference in its entirety.

BACKGROUND

P-type, intrinsic and n-type semiconductor (PIN) regions are commonly used in combination in semiconductor structures to construct devices. For example, in optoelectronics devices, PIN regions are used to form photodetectors which detect light delivered by a waveguide, converting the light signals into electrical signals which can be amplified and then processed.

In many applications semiconductor structures are fabricated from layers deposited on a substrate. To construct PIN devices in the semiconductor structure, a layer of n-type semiconductor material is commonly deposited as a base with the other constituent layers of the devices deposited on top, with the PIN devices planarly separated across the surface of the substrate. This leads to all PIN devices sharing the same low resistance n-type semiconductor material base which acts as a common cathode.

In optoelectronics devices, components, such as PIN semiconductor structures, are optically connected by waveguides. Thus components are connected by waveguides and low resistance n-type semiconductor material. The PIN semiconductor structures often form sensors such as photodetectors. Electrical connectivity between components can lead to electrical cross-talk which can reduce the lifetime of components and introduce error in sensitive measurements.

It is desirable to reduce undesirable flow of electrical current between components of a photonic integrated circuit (PIC).

DETAILED DESCRIPTION

Figure 1:
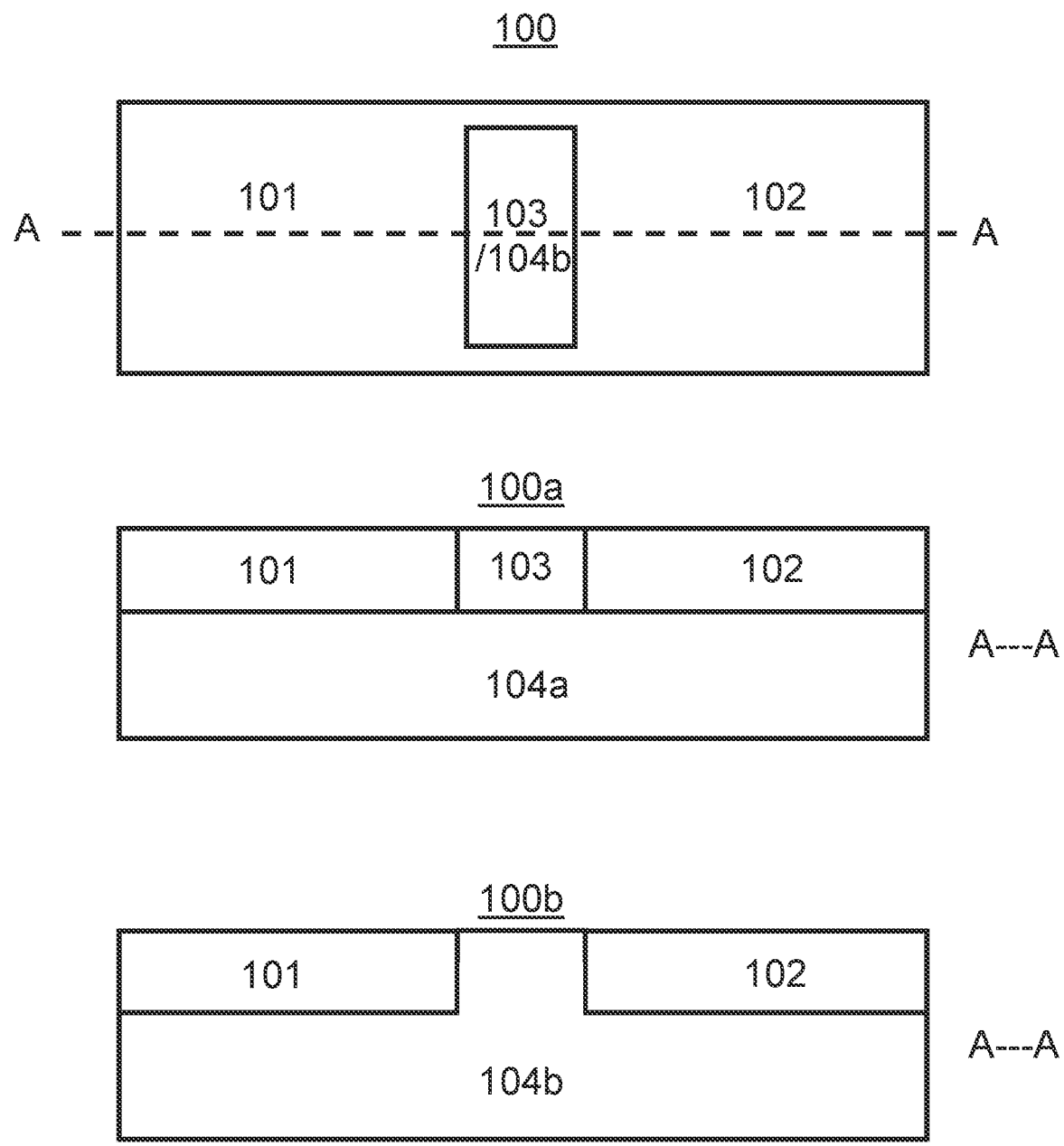
FIG. 1 is a schematic diagram illustrating a structure for a photonic integrated circuit comprising a substrate, an n-type semiconductor material and an element, according to examples.

Examples described herein relate to a structure for a photonic integrated circuit (PIC) where electrical connectivity between at least two components is reduced, such that a tendency for electrical current to flow between components is restricted, prevented or opposed. Accordingly, such a structure may have reduced electrical cross-talk between components. This may increase the lifetime of PIC components and thus the lifetime of the PIC itself and may reduce the error induced in sensor or detector PIC components such as photodetectors, allowing for more sensitive measurements. This allows for more efficient optoelectronic devices and therefore for a more efficient PIC.

In particular, during propagation of light along a waveguide, an undesirable electrical current may also flow through the waveguide itself. In addition, electrical current may also flow via semiconductor material in contact with the waveguide, such as underlying n-type semiconductor material. In examples described herein, there is an element between portions of n-type semiconductor material, with the element configured to reduce flow of electric current from one of the portions to the other whilst light is propagating along the waveguide. Such an element is for example at least one of a block or layer or volume or region of material, with appropriate dimensions and of a material of an appropriate electrical resistivity, such that the element reduces the flow of electric current between the portions of n-type semiconductor material during light propagation along the waveguide. For example, the resistivity of the material of the element is greater than the resistivity of the n-type semiconductor material, for example by a factor of at least 10,000, and in some examples a factor of more than 1 billion. In some examples the resistivity of the material of the element is $10^4$ Ohm centimetres ($\Omega^*$cm), or higher, compared with a resistivity of the n-type semiconductor material of 1 $\Omega^*$cm or less. Reducing the flow can be at least one of restricting, preventing or opposing the flow of electrical current. Thus, it is believed, but should not be held to be limiting, that the waveguide and abutting semiconductor material together act as an electrical current conductor, with the presence of the element reducing a cross-sectional area of the conductor through which electrical current can flow. Thus, the element can be considered to reduce or attenuate flow of electrical current via the semiconductor material abutting the waveguide, and hence reduce a maximum rate of flow of electrical current such that it, for example, is closer to or equals the electrical conductivity of the waveguide, rather than the electrical conductivity of the combination of the waveguide and abutting semiconductor material.

It should be noted that for structural diagrams, semiconductor material layers relevant to the disclosure are shown. Materials and structures that fulfil auxiliary functions such as electronic conductivity or passivation against the environment in the PIC are omitted from the structural diagrams for clarity, but the skilled person will appreciate the presence of these materials and structures where appropriate. For example, there may be p-type semiconductor material on a waveguide, and/or another material, with a suitable refractive index, such as air, glass, a polymer, in contact with the waveguide to confine the light.

FIG. 1 is a schematic diagram illustrating a structure for a PIC comprising a substrate, an n-type semiconductor material and an element configured to reduce electric current flow, according to examples. In examples described below, the first and second portions of n-type semiconductor material are of a first layer and hence the n-type semiconductor material of the first portion is substantially the same (e.g. the same within acceptable tolerances) as the n-type semiconductor material of the second portion. But in other examples the first and second portions may be of different layers, deposited separately from each other, or at least entirely separate from each other, which may each have a different n-type semiconductor material.

View 100 is a plan view of parts of the structure. View 100a illustrates first examples of a cross section of the structure 100 along a longitudinal axis corresponding with line A-A in view 100. The structure of view 100a comprises a substrate 104a, a first portion 101 of a first layer of a n-type semiconductor material, a second portion 102 of the first layer of the n-type semiconductor material and an element 103 of a material different from the n-type semiconductor material. The element in examples described herein is illustrated as a block of material, for example a cuboidal layer. The dimensions and proportions of the element between portions of the first layer in examples are chosen in dependence on a required resistance against the flow of electrical current. In some examples, the element is abutted on one or more, or all, lateral sides by n-type semiconductor material.

The substrate 104a is of a solid crystalline material with a substantially planar surface (e.g. planar within acceptable tolerances). The material may be of binary semiconductor compound. For example, the substrate 104a comprises InP. That is the substrate 104a comprises mainly InP. By saying the substrate 104a comprises mainly a particular compound, for example InP, the semiconductor material comprises more than 50% of that element, e.g. InP, in chemical composition. The substrate 104a may be purely InP (within acceptable purity tolerances) with the material comprising at least 99% InP. The substrate 104a may comprise other materials such as dopants or impurities. For example, the substrate 104a is doped with a dopant material so that the substrate is n-doped. The substrate 104a may be doped so as to increase the electrical resistivity of the substrate 104a relative to its undoped state.

The first layer of n-type semiconductor material is on the substrate 104a, with the first layer directly in contact with the upper surface of the substrate 104a. In other examples it is envisaged that the first layer of n-type semiconductor material is on the substrate in that it is supported by the substrate, but with at least one intervening layer between the substrate and the first and second portions. The n-type semiconductor material comprises semiconductor material doped with donor impurities such that there is an abundance of free electrons, increasing the conductivity of the semiconductor material relative to the intrinsic semiconductor material or semiconductor material prior to doping. The majority of charge carriers in the n-type semiconductor material are negative electrons. In examples, the n-type semiconductor material may be highly doped with donor impurities, where the dopant comprises a significant percentage of the chemical constituents of the semiconductor material.

The first layer of the n-type semiconductor material comprises the first portion 101 on a first surface area of the substrate and the second portion 102 on a second surface area of the substrate. A portion of the semiconductor material refers to a volume or region of the semiconductor material. The thickness of the first layer is taken between a surface of the first layer e.g. in contact with the substrate and a surface of the first layer further from the substrate, in a direction perpendicular the surface of the substrate which the first layer contacts. In examples, the first surface area of the substrate does not overlap the second surface area of the substrate. Thus, the first portion and second portion of the n-type semiconductor material do not overlap. In examples the first portion 101 and second portion 102 of the n-type semiconductor material have the same thickness (e.g. greater than or equal to 0.1 microns and e.g. less than or equal to 10 microns) within acceptable tolerances and are substantially planar (e.g. the portions are deposited on the substrate 104a such that the upper surface of each of the layers is parallel with the surface of the substrate 104a which the first layer is deposited on). In examples, both the first portion and second portion are deposited simultaneously during a single deposition process of a complete layer, but the combination of the first surface area and second surface area of the substrate 104a do not cover the entire surface area of the substrate 104a, in that there is at least a third surface area of the substrate not covered by the first layer.

The element 103 is between the first portion 101 and the second portion 102 of the first layer of the n-type semiconductor material. The element 103 abuts the first portion 101 and second portion 102. In examples, the surface area on which the element is located is bounded at least in part by the combination of the first surface area of the substrate and the second surface area of the substrate. The element is on a third surface area of the substrate 104a, between the first and second surface areas. The third surface area of the substrate does not overlap with the first or second surface area of the substrate 104a.

The element 103 has a thickness substantially equal to a thickness of at least one of part of the first portion 101 or part of the second portion 102 of the first layer abutting the element 103. In examples, the first layer, comprising the first portion 101 and second portion 102, in combination with the element 103, cover substantially the whole surface area of the substrate (e.g. except for areas of the substrate that may be clamped by a wafer clamp of a reactor in which the semiconductor is being manufactured). The first portion 101, second portion 102 and element 103 are of substantially equal thickness (e.g. equal thickness within acceptable tolerances). The thickness of a layer is taken as explained earlier. An upper surface of each of the first portion 101, second portion 102 and the element 103 are co-planar, to produce in combination a planar surface for depositing further layers.

The material of the element 103 has a higher electrical resistance relative to the electrical resistance of the n-type semiconductor material of at least one of the first or second portions. The electrical resistance can be considered to be a measure of the ability of a material to restrict, prevent or oppose the flow of electric current. The electrical resistance depends on the electrical resistivity and the dimensions (and hence volume) of the material. Thus, the n-type semiconductor material has a higher electrical conductance relative to the electrical conductance of the material of the element. The electrical conductance can be considered to be a measure of the ease or rate with which an electric current flows through the semiconductor material. The material of the element can be substantially the same or similar to that of the substrate, or in other examples can be a different material to the substrate. The electrical resistivity can be considered to be an intrinsic property of a specific material which restricts, prevents or opposes flow of electrical current, for a given unit volume of the material.

In examples, the n-type semiconductor material comprises mainly InP and may be doped with an appropriate dopant such as sulfur (S) or silicon (Si). In examples, the material of the element comprises InP doped with a material to give the element semi-insulating properties compared to the n-type semiconductor material. Semi-insulating materials typically have conductivity close to that of insulators but can still carry electrical current to some extent. In examples, the material of the element is indium phosphide (InP), indium aluminium arsenide (InAlAs), indium gallium aluminium arsenide (InGaAlAs) and/or indium gallium arsenide phosphide (InGaAsP) doped with iron (Fe), Ruthenium (Ru), Vanadium (V) and/or Titanium (Ti) at a dopant concentration of for example between $1e^{16}$ to $1e^{19}$ cm$^{-3}$. The element in some examples has a length, taken in the light propagation direction (along the longitudinal axis of a corresponding waveguide) of up to 500 microns. A width of the element, perpendicular the light propagation direction, is for example at least the width of the portion of waveguide on the element, and in some examples up to 1 millimetre wide.

In other examples, the n-type semiconductor material comprises a ternary semiconductor alloy or a quaternary semiconductor alloy, for example a III-V semiconductor compound, containing elements from group III and group V in the periodic table. Group III materials include boron (B), aluminium (Al), gallium (Ga) and indium (In). Group V materials include nitrogen (N), phosphor (P), arsenic (As) and antimony (Sb). The n-type semiconductor material is for example a nitride, phosphide, arsenide or antimonide.

View 100b is a diagram in accordance with second examples of a cross section of the structure 100 along a longitudinal axis corresponding with line A-A in view 100. Features of view 100a are similar to those of view 100b except that the element between the first and second portions is part of the substrate 104b. Hence, the substrate 104b is of substantially the same material (e.g. the same within acceptable tolerances) as the element, such as the material of the element 103 described above, with the higher electrical resistance compared with the n-type semiconductor material. The element in the examples of view 100b is an integral part of the substrate and so protrudes from the plane of the first and second surface areas, in between the first portion and the second portion of the first layer.

Note that features in one Figure are common or similar to features in another Figure. Such features are labelled with the same reference numeral, but prefixed with a different value corresponding to the Figure number. So, feature 101 in FIG. 1 corresponds to feature 201 in FIG. 2. For such features, for conciseness, an earlier description of the feature should be taken to apply for the feature in Figures described later. It should also be noted that preceding examples demonstrate a structure with the element 103 deposited on the surface of the substrate 104a and, in other examples, the substrate and element integrated and of the same material 104b. Such alternative forms of the substrate and of the element are envisaged to apply for further examples described later.

Figure 2:
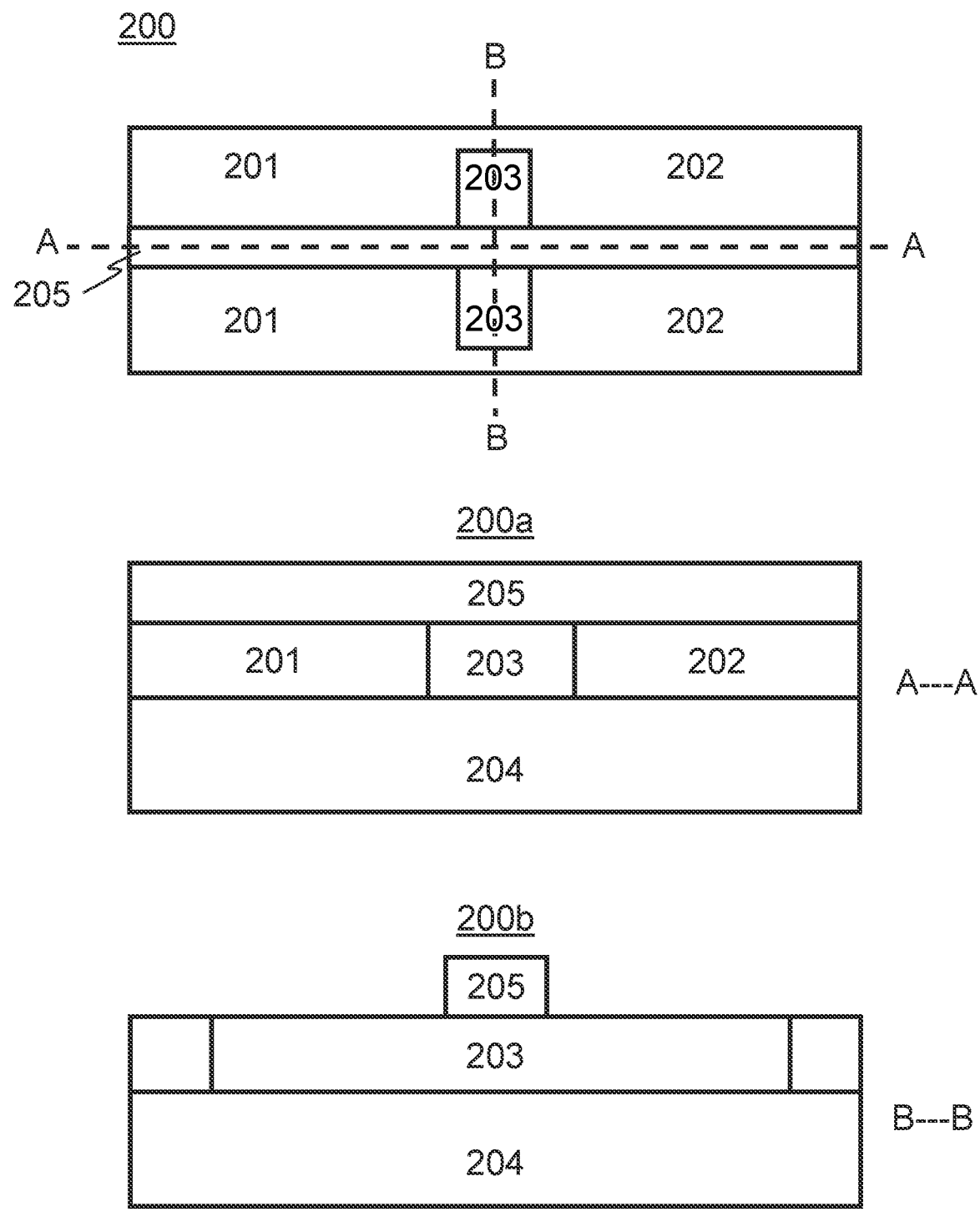
FIG. 2 is a schematic diagram illustrating the structure for a photonic integrated circuit from FIG. 1 with a waveguide, according to examples.

FIG. 2 is a schematic diagram illustrating the structure for a PIC from FIG. 1 with a waveguide, according to examples. View 200 illustrates a plan view of parts of the structure. View 200a is a cross section along line A-A corresponding with a longitudinal axis and view 200b is a cross section taken along a transverse axis B-B perpendicular to the longitudinal axis. The structure comprises a waveguide 205 on, and in contact with, the element 203. The waveguide is a structure which guides electromagnetic waves with, in at least some examples, minimal loss of energy. In examples, the waveguide guides light by constraining the transmission of energy of the light to one direction. In some examples the waveguide is of at least one layer of a single InGaAsP alloy and an InP layer, or in other examples the waveguide is of at least one layer each of different InGaAsP alloys and InP. The waveguide material(s) may be doped to tune their performance. It should be appreciated that at least in some examples an outer boundary of the waveguide corresponds with a boundary within which light propagating along the waveguide is confined.

In examples, the waveguide comprises intrinsic semiconductor material. Intrinsic semiconductor material can be considered a pure semiconductor material. A pure semiconductor material is a semiconductor material without any significant dopant species present such that the number of electrons in the conduction band is equal to the number of holes in the valence band at operation temperature, within acceptable tolerances. The operation temperature is the temperature at which the device comprising the intrinsic semiconductor materials function is utilised. In examples, the waveguide comprises a plurality of layers. The waveguide comprises two material layers of InGaAsP and InP, where the light is confined between the layers. In other examples, the waveguide may comprise one layer of semiconductor material.

Figure 3:
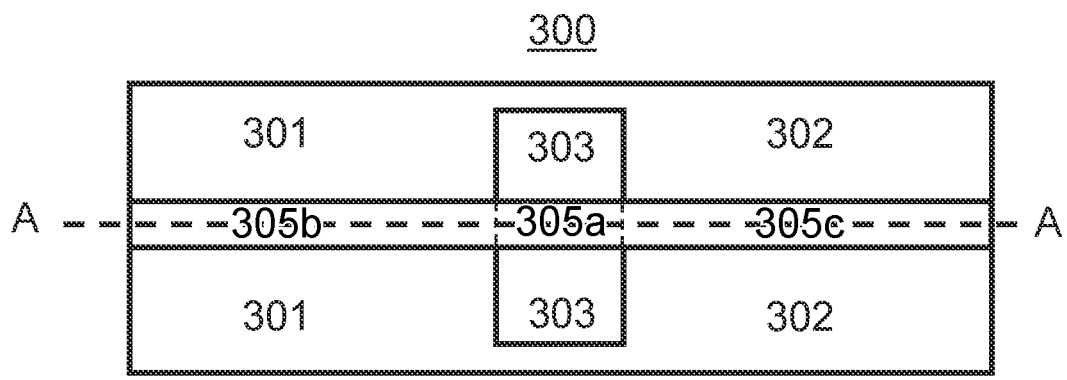
FIG. 3 is a schematic diagram illustrating the waveguide from FIG. 2 in more detail, according to examples.
Figure 3:
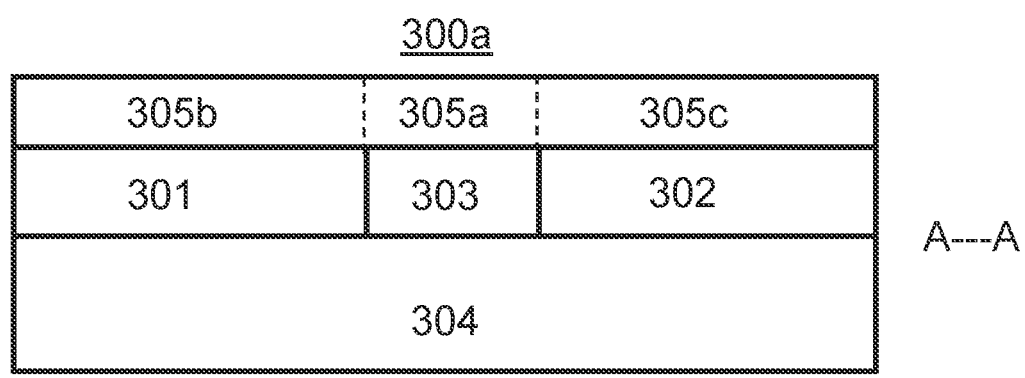

FIG. 3 is a schematic diagram illustrating the waveguide from FIG. 2 in more detail, according to examples. View 300 illustrates a plan view of parts of the structure and view 300a illustrates a longitudinal cross section of the structure corresponding with line A-A in view 300. The waveguide 305 has a first portion of the waveguide 305a, a second portion of the waveguide 305b and a third portion of the waveguide 305c. The first portion 305a, second portion 305b and third portion 305c have substantially the same thickness such that the upper surface of the waveguide 305 has a planar surface. The first portion 305a, second portion 305b and third portion 305c are located along a longitudinal axis of the waveguide where the first portion 305a is at a first point of the longitudinal axis, the second portion 305b is at a second point of the longitudinal axis and the third portion 305c is at a third point of the longitudinal axis.

In examples, the first portion of the waveguide 305a is on and in contact with a surface area of the element. The first portion of the waveguide 305a does not overlap the first portion 301 or second portion 302 or indeed any of the first layer of the n-type semiconductor material. The second portion of the waveguide 305b is on a surface area of the first portion 301 of the first layer of the n-type semiconductor material. The surface area of the first portion 301 of the first layer does not overlap the element 303. The third portion of the waveguide 305c is on a surface area of the second portion 302 of the first layer of n-type semiconductor material. The surface area of the second portion 302 of the first layer does not overlap the element 303.

The waveguide 305, along a transverse axis of the structure, parallel with the surface of the substrate 304 and perpendicular to a longitudinal axis of the waveguide, has a width which, in examples, is less than the length of the waveguide 305 along the longitudinal axis of the waveguide, and is equal to or less than a width of the element.

Figure 4:
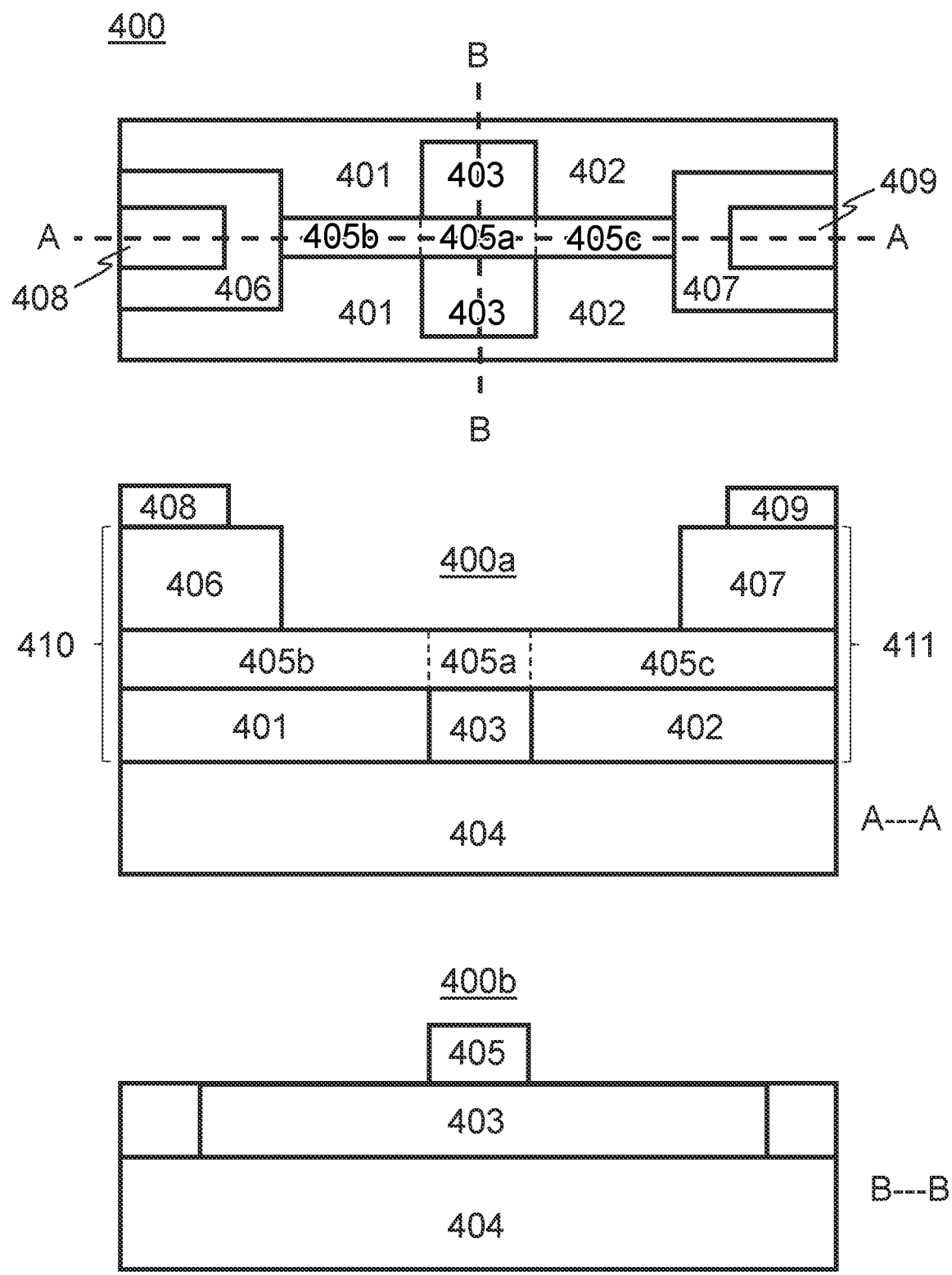
FIG. 4 is a schematic diagram illustrating the structure for a photonic integrated circuit from FIG. 2 with PIC components, according to examples.

FIG. 4 is a schematic diagram illustrating the structure for a photonic integrated circuit from FIG. 2 with PIC components, according to examples. View 400 illustrates a plan view of parts of the structure. View 400a illustrates a longitudinal cross section of the structure corresponding with line A-A in Figure view 400 and view 400b illustrates a transverse cross section of the structure corresponding with line B-B in view 400. In examples, the structure comprises a first portion 406 and a second portion 407 of p-type semiconductor material. The first portion of the p-type semiconductor material 406 is deposited on part of the second portion of the waveguide 405b and the second portion 407 of the p-type semiconductor material is deposited on part of the third portion of the waveguide 405c. The first portion of the p-type semiconductor material 406 is deposited on part of the first portion of the first layer of n-type semiconductor material 401 and the second portion of the p-type semiconductor material 407 is deposited on part of the second portion of the first layer of n-type semiconductor material 402.

The p-type semiconductor material comprises semiconductor material which is doped with acceptor impurities such that there is an abundance of holes, increasing the conductivity of the semiconductor material relative to the intrinsic semiconductor material or semiconductor material prior to doping. The majority of charge carriers in the p-type semiconductor material are positive holes. In examples, the p-type semiconductor material may be highly doped with acceptor impurities, where the dopant comprises a significant percentage of the chemical constituents of the semiconductor material. The p-type semiconductor material is for example of doped InP, InGaAsP, InAlGaAs, InGaAs, or InAlAs.

The combination of the first portion of p-type semiconductor material 406, part of the second portion of the waveguide 405b and part of the first portion of n-type semiconductor material 401, forms at least part of a first PIC component 410 comprising a PIN structure. A first electrical contact layer 408 is deposited on the first portion p-type semiconductor material 406. The combination of the second portion of p-type semiconductor material 407, part of the third portion of the waveguide 405b and part of the second portion of n-type semiconductor material 402, forms a second PIC component 411 comprising a PIN structure. A second electrical contact layer 409 is deposited on the second portion of p-type semiconductor material 406. In examples, the first electrical contact layer 408 and second electrical contact layer 409 are composed of a metal material. The electrical contact layers allow a voltage to be applied across each PIN structure. The contact layer for the p-type semiconductor material is for example a combination of titanium (Ti), platinum (Pt) or Chromium (Cr) and Gold (Au).

In some examples, there is an absence of p-type semiconductor material, at least along the longitudinal axis of the respective waveguide, between the p-type semiconductor layers of two PIC components. For example, there may be a material with a higher resistivity than the p-type semiconductor material, such as air. This may be achieved by depositing a layer of p-type semiconductor material to include p-type material for the PIC components, then etching to remove some of the p-type material between the PIC components. Such an absence of p-type material can also help reduce flow of electrical current between PIC components, especially if the element described herein is used to reduce electrical current flow in the n-type semiconductor layer.

A PIC component is any component, electrical or optical which can be used to form a PIC. PIC components include waveguides, multimode interferometers (MMIs), P-N junctions, a semiconductor optical amplifier (SOA), an electro-absorption modulator (EAM) or an electro-optic phase modulator (EOPM). MMIs can be used to split light into its constituent eigenmodes. P-N junctions comprise p-type and n-type semiconductor material and are used to construct many PIC components such as photodetectors.

In examples, the PIN structure of the first PIC component 410 and first electrical contact layer 408 are together a first photodiode. A photodiode is a photodetector which can convert optical signals into electrical signals. The photodetector allows for electrical readout of signals that can be carried by the light confined in the waveguide. In other examples, the PIN structure of the second PIC component 411 and second electrical contact layer 409 are together a second photodiode.

The first portion of the waveguide 405a is located between, when taken along the longitudinal axis of the waveguide, the first PIC component and second PIC component. The first PIC component 410 and second PIC component 411 are optically connected by the waveguide 405. Optically connected typically means that light confined by the waveguide 405 is able to travel between the first PIC and second PIC component without significant loss in energy. Without significant loss of energy typically means that no energy is lost however, a negligible amount of energy may be lost within acceptable tolerances.

The material of the element 403 is configured to restrict, prevent or oppose the flow of current between the first PIC component 410 and second PIC component 411, such that there is an observable reduction or prevention of electrical current flowing between the first PIC component 410 and second PIC component 411 compared to the current flowing between the two PIC components if the element 403 was instead of the n-type semiconductor material. Note that even in the case of entirely preventing the current flow, it is appreciated that a negligible current may still flow between the two PIC components.

In examples the element 403 is, when taken along the longitudinal axis, between the first PIC 410 and second PIC component 411. The element 403 is configured such that it has an increased electrical resistance relative to the n-type semiconductor material of the first portion 401 and second portion 402 of the first layer. A current might still be able to flow to some degree between the first and second PIC components via the first portion of the first layer of n-type semiconductor material 401 through the second element 403 to the second portion of the first layer of n-type semiconductor material 402. A current can also flow between the first and second PIC components via the waveguide 405 material(s). The greater electrical resistance of the element 403 may however restrict the flow of the current to the waveguide 405, in turn decreasing the cross-sectional amount (e.g. along B-B) of electrically conductive material through which the electrical current can flow.

Figure 5:
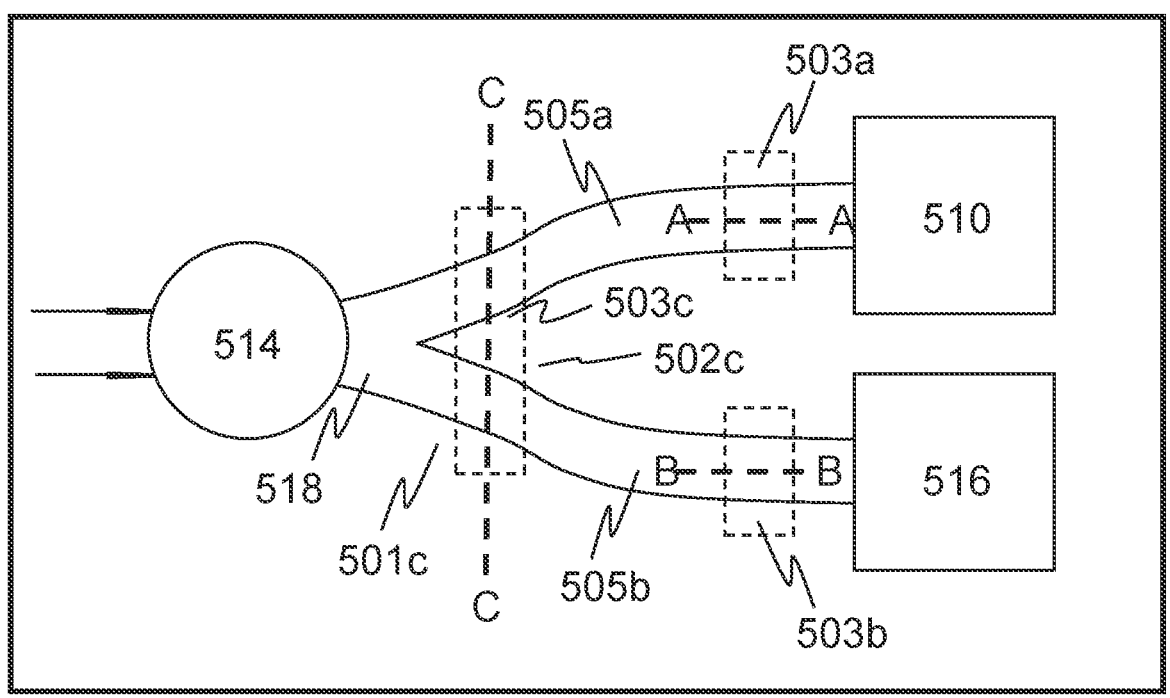
FIG. 5 is a schematic diagram illustrating a structure for a photonic integrated circuit comprising a balanced photodetector, according to examples.

FIG. 5 is a schematic diagram illustrating a structure for a PIC comprising a balanced photodetector, according to examples. The diagram illustrates a plan view of at least part of the structure. The structure is a structure of semiconductor materials. The structure comprises a first PIC component 510 and a first waveguide 505a optically connecting the first PIC component to a second PIC component 514. The second PIC component 514 is optically connected to a third PIC component 516 by a second waveguide 505b. The first waveguide 505a and second waveguide are for example composed of an identical material composition 502b within acceptable tolerances.

The structure comprises a substrate with a first layer of n-type semiconductor material thereon. The n-type semiconductor material has a first electrical resistance. In some examples the structure also comprises a first element 503a and a second element 503b. In other examples, instead of the first and second elements, the structure instead comprises a third element 503c deposited on the upper surface area of the substrate. An element refers to a block, volume, region or layer of the semi-insulating material described above, dimensioned appropriately to reduce electrical current flow between respective first and second portions of the first layer on either side of each block. The plurality of n-type semiconductor material portions 501, 502 and the first element 503a, second element 503b and third element 503b do not overlap each other.

The material of the element has a second electrical resistance. The first electrical resistance is less than the second electrical resistance such that the respective elements are each configured to reduce electric current flow, similar in function to an electrical resistor for example, as each element has a greater electrical resistance than the electrical resistance of the n-type semiconductor material. Such an element reduces flow of electrical current from one side of the element to the other, for example by restricting, preventing or opposing the flow of electrical current. The plurality of portions of the first layer of n-type semiconductor material 501, 502 and the first element 503a, second element 503b and third element 508 together provide a substantially planar upper surface. The first waveguide 505a and second waveguide 505b are deposited on the first layer of n-type semiconductor and also on respective elements.

Figure 6:
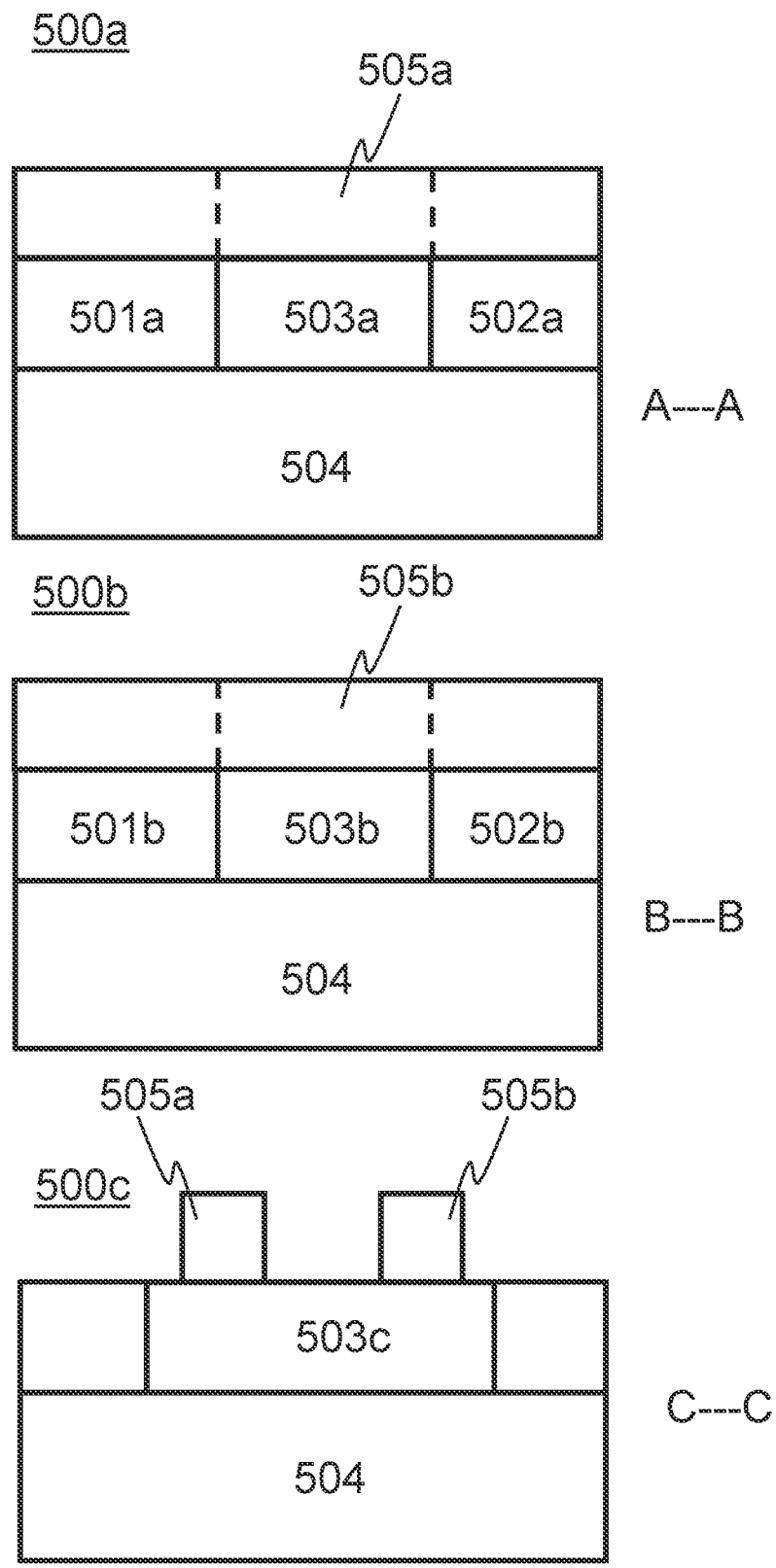
FIG. 6 is a schematic diagram illustrating aspects of the balanced photodetector of FIG. 5 in more detail, according to examples.

FIG. 6 is a schematic diagram illustrating aspects of the balanced photodetector of FIG. 5 in more detail, according to examples. View 500a illustrates a cross section of the structure at a longitudinal axis corresponding with line A-A in view 500, for the first waveguide 505a. The first element 503a, is deposited between and abuts each of a first portion 501a of the n-type semiconductor material and a second portion 502a of the n-type semiconductor material. The first element 503a is located at a first point on the longitudinal axis of the first waveguide 505a and is overlapped by and in contact with a first portion of the first waveguide 505a. Overlapped by typically means that a first portion of the first waveguide 505a is on or covers at least part of the first element 503a. At a second point on the longitudinal axis of the first waveguide, a second portion of the first waveguide 505a is on and in contact with the first portion of the first layer of n-type semiconductor material 501a. At a third point on the longitudinal axis of the first waveguide 505a a third portion of the first waveguide 505a is on and in contact with the second portion of the first layer of n-type semiconductor material 502a.

View 500b illustrates a cross section of the structure at a longitudinal axis corresponding with line B-B in view 500, for the second waveguide 505b. The second element 503b is deposited between and abuts each of a third portion 501b of the n-type semiconductor material and a fourth portion 502b of the n-type semiconductor material. The second element 503b is located at a first point on the longitudinal axis of the second waveguide 505b and is overlapped by a first portion of the second waveguide 505b. At a second point on the longitudinal axis of the second waveguide 505b, a second portion of the second waveguide 505b overlaps the third portion of the first layer of n-type semiconductor material 501b. At a third point on the longitudinal axis of the second waveguide 505b a third portion of the second waveguide 505b overlaps the fourth portion of the first layer of n-type semiconductor material 502b.

In examples such as that of FIG. 5, the second PIC component 514 is a multimode interferometer (MMI). Before the MMI, light is confined by a single waveguide. After the MMI, the light reaches a junction where the single waveguide splits into the first waveguide 505a and second waveguide 505b. View 500c illustrates a cross section of the structure at a transverse axis corresponding with line C-C in view 500, for the waveguide junction 518 where the waveguide splits into the first waveguide 505a and second waveguide 505b. The third element 503c is deposited between and abuts a fifth portion 501c of the n-type semiconductor material and a sixth portion 502c of the n-type semiconductor material. The third element 503c is located between first and second PIC components on one side, and on the other side the waveguide junction 518 which is optically connected to the first waveguide 505a and second waveguide 505b. The term between at least in this example is used with reference to components on the longitudinal axis of the respective waveguide, taking into account any bend or other non-straight line shape of the waveguide. A portion of the first waveguide 505a is deposited on a first part of the third element 503c. A portion of the second waveguide 505b is deposited on a second part of the third element 503c. The first and second parts of the third element 503c, do not overlap.

The first PIC component 510 is comprised of part of the first layer of n-type semiconductor material, part of the first waveguide 505a, a first portion of p-type semiconductor material deposited on a portion of the first waveguide 505a and an electrical contact layer deposited on a portion of the first portion of p-type semiconductor material.

The third PIC component 516 is comprised of part of the first layer of n-type semiconductor material, part of the second waveguide 505b, a second portion of p-type semiconductor material deposited on a portion of the second waveguide 505a and an electrical contact layer deposited on a portion of the first portion of p-type semiconductor material.

The first PIC component 510 and third PIC component 516 are photodiodes and are configured in combination with the MMI 503 to operate as a balanced photodetector. In the examples with the first element 503a and second element 503b, and in the alternative examples with the third element 503c, each element acts to reduce, by for example restricting, preventing, or opposing the flow of electric current between the first photodiode 510 and second photodiode 516. Hence, electrical cross-talk between the photodiodes can be reduced.

As the skilled person will appreciate, various techniques may be used to deposit and pattern the layers of semiconductor material in accordance with examples described herein. Such techniques may include chemical vapour deposition techniques such as metalorganic vapour-phase epitaxy (MOVPE) or molecular beam epitaxy (MBE). Etching techniques may be used to remove portions of material, as part of patterning, as the skilled person will appreciate.

Figure 7:
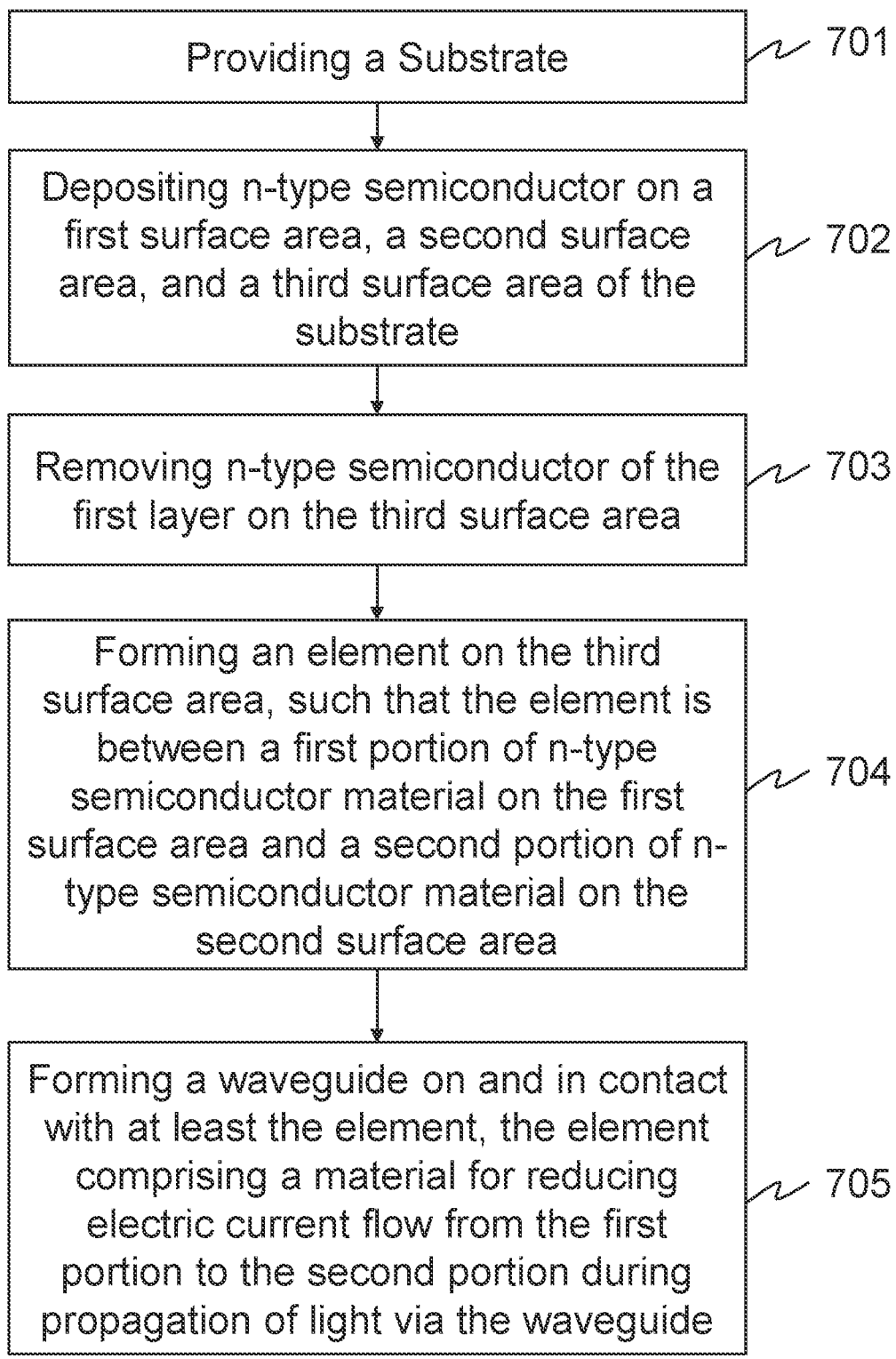
FIGS. 7 and 8 illustrate methods of manufacture according to examples.

Hence, in accordance with some examples, and see 701 to 705 of FIG. 7, a structure in accordance with examples described above is manufactured by a method comprising: providing a substrate; depositing n-type semiconductor on the first surface area, the second surface area, and the third surface area of the substrate; removing n-type semiconductor of the first layer on the third surface area; forming the element on the third surface area, such that the element is between the first portion of n-type semiconductor material on the first surface area and the second portion of n-type semiconductor material on the second surface area; and forming a waveguide on and in contact with at least the element, the element comprising a material for reducing electric current flow from the first portion to the second portion during propagation of light via the waveguide.

Figure 8:
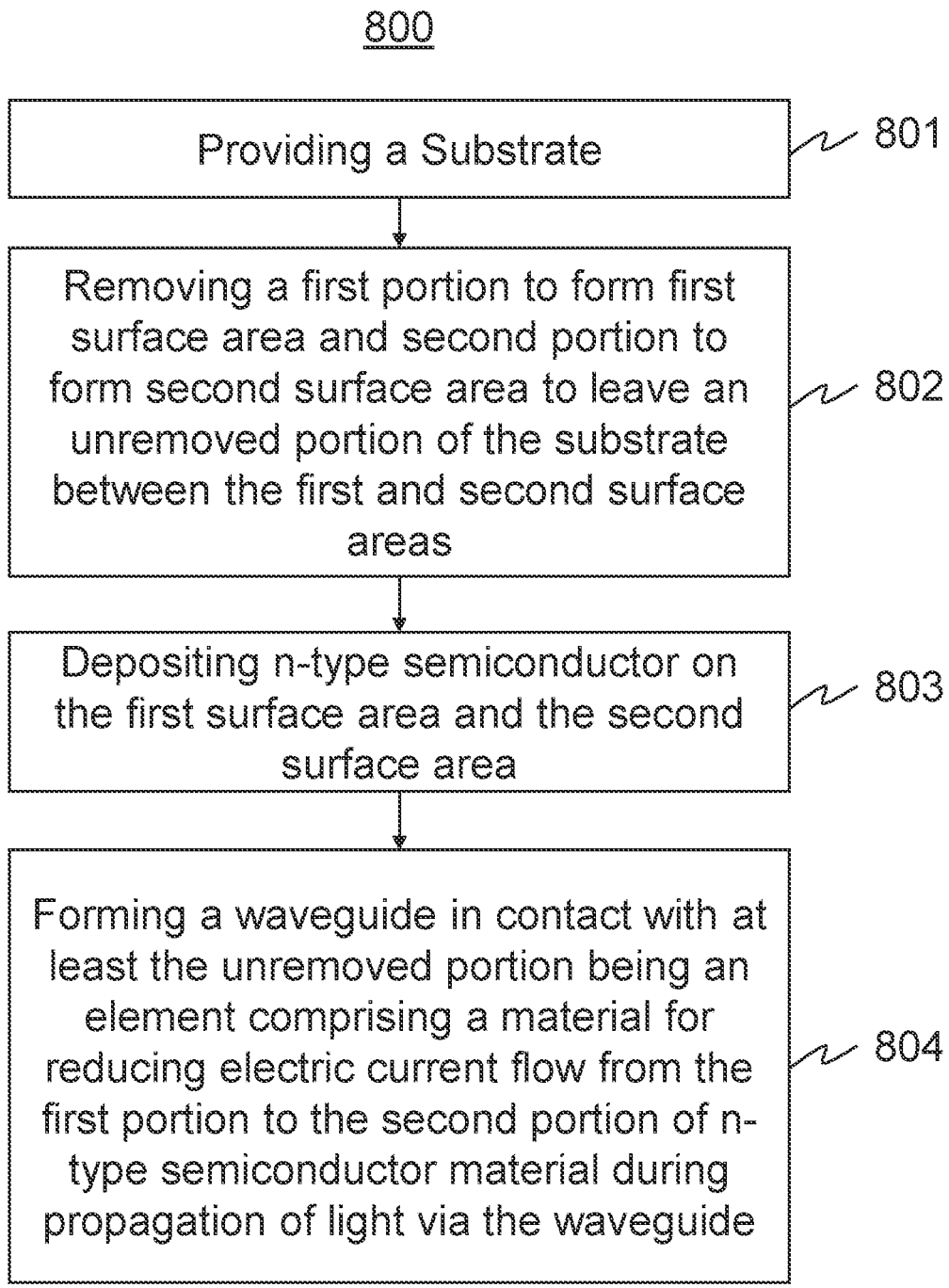

In accordance with other examples, and see 801 to 804 of FIG. 8, the structure is manufactured by a method comprising: providing the substrate; removing a first portion of the substrate to form the first surface area of the substrate, and removing a second portion of the substrate to form the second surface area of the substrate, to leave an unremoved portion of the substrate between the first surface area and the second surface area, the unremoved portion corresponding to the third surface area of the substrate; depositing n-type semiconductor on the first surface area and the second surface area; forming the waveguide on and in contact with at least the unremoved portion, the unremoved portion being the element between the first portion of n-type semiconductor material and the second portion of n-type semiconductor material, the element comprising a material for reducing electric current flow from the first portion of n-type semiconductor material to the second portion of n-type semiconductor material during propagation of light via the waveguide.

Further, the method in examples comprises: forming the first PIC component (such as a photodiode); forming the second PIC component (such as a MMI) optically connected to the first PIC component by the waveguide, with the element dimensioned and of a material with an electrical resistivity such that the element at least one of reduces, prevents or opposes electric current flow between the first PIC component and the second PIC component.

The above examples are to be understood as illustrative examples. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A structure for a photonic integrated circuit, comprising:
    a substrate;
    a first portion of n-type semiconductor material on a first surface area of the substrate;
    a second portion of n-type semiconductor material on a second surface area of the substrate;
    a waveguide; and
    an element, wherein:
    the element is a block of material between the first portion and the second portion;
    the element is an integral part of the substrate and is of the same material as the substrate;
    the waveguide is on and in contact with the element; and
    the element is configured to reduce electric current flow from the first portion to the second portion during propagation of light via the waveguide.

2. The structure of claim 1, wherein
    the n-type semiconductor material of the first portion is the same as the n-type semiconductor material of the second portion, a first layer of the n-type semiconductor material comprising the first portion and the second portion.

3. The structure of claim 1, wherein:
    along a transverse axis perpendicular a longitudinal axis of the waveguide, the waveguide does not overlap the first portion or the second portion;
        at a first point on the longitudinal axis of the waveguide, a first portion of the waveguide overlaps the element; and
        at a second point on the longitudinal axis of the waveguide, a second portion of the waveguide does not overlap the element.

4. The structure of claim 3, wherein, at a third point on the longitudinal axis of the waveguide, with the first point between the second point and the third point, a third portion of the waveguide does not overlap the element.

5. The structure of claim 4, wherein the second portion of the waveguide is on and in contact with the first portion of n-type semiconductor material and the third portion of the waveguide overlaps the second portion of the n-type semiconductor material.

6. The structure of claim 3, wherein:
    the first portion of the waveguide is located between a first PIC component and a second PIC component, the first PIC component optically connected by the waveguide to the second PIC component,
or
    the first portion of the waveguide is located between a first PIC component and a second PIC component, the first PIC component optically connected by the waveguide to the second PIC component, and the first PIC component comprises part of the first portion of the n-type semiconductor material and the second PIC component comprises part of the second portion of the n-type semiconductor material,
or
    the first portion of the waveguide is located between a first PIC component and a second PIC component, the first PIC component optically connected by the waveguide to the second PIC component, the first PIC component comprises part of the first portion of the n-type semiconductor material and the second PIC component comprises part of the second portion of the n-type semiconductor material, and the first PIC component comprises a first portion of p-type semiconductor material on the second portion of the waveguide.

7. The structure of claim 6, wherein the element is dimensioned and is of a material with an electrical resistivity such that the element at least one of reduces, prevents or opposes electric current flow between the first PIC component and the second PIC component.

8. The structure of claim 6, wherein at least one of:
    the first PIC component is a first photodiode; or
    at a third point on the longitudinal axis of the waveguide, with the first point between the second point and the third point, a third portion of the waveguide does not overlap the element and the second PIC component comprises a second portion of p-type semiconductor material on the third portion of the waveguide.

9. The structure of claim 6, wherein the first PIC component is a first photodiode, the waveguide is a first waveguide, and the structure comprises a second waveguide optically connecting the second PIC component to a third PIC component.

10. The structure of claim 9, wherein the element is a first element, the structure comprising:
    a second element between a third portion of n-type semiconductor material and a fourth portion of n-type semiconductor material, a first portion of the second waveguide, at a first point on a longitudinal axis of the second waveguide, on and in contact with the second element, the second element configured to reduce electric current flow between the third portion and the fourth portion,
    wherein at a second point on the longitudinal axis of the second waveguide, a second portion of the second waveguide overlaps the third portion of n-type semiconductor material, and
    at a third point on the longitudinal axis of the second waveguide, a third portion of the second waveguide overlaps the fourth portion of n-type semiconductor material.

11. The structure of claim 9, the element located, as taken along the longitudinal axis of the respective waveguide, between: a waveguide junction optically connected to the first waveguide and to the second waveguide, and each of the first PIC component and the third PIC component,
   wherein at a second point on the longitudinal axis of the second waveguide, a second portion of the second waveguide overlaps the first portion of n-type semiconductor material, and
   at a third point on the longitudinal axis of the second waveguide, a third portion of the second waveguide overlaps the second portion of n-type semiconductor material.

12. The structure of claim 11, wherein a portion of the first waveguide and a portion of the second waveguide are each on and in contact with the element.

13. The structure of claim 11, wherein the second PIC component comprises at least one of: a light splitter or a multimode interferometer, MMI.

14. The structure of claim 9, wherein the third PIC component is a second photodiode configured to function in combination with the first photodiode as a balanced photodetector.

15. The structure of claim 1, wherein the element has a thickness substantially equal to a thickness of at least one of part of the first portion or part of the second portion abutting the element.

16. The structure of claim 1, wherein at least one of:
the n-type semiconductor material is a III-V compound;
the n-type semiconductor material is InP; or
the element is of at least one of: a III-V compound or InP doped with iron, Fe.

17. A method of manufacturing the structure for a photonic integrated circuit of claim 1, the method comprising:
   providing the substrate;
   removing a first portion of the substrate to form the first surface area of the substrate, and removing a second portion of the substrate to form the second surface area of the substrate, to leave an unremoved portion of the substrate between the first surface area and the second surface area, the unremoved portion corresponding to a third surface area of the substrate;
   depositing n-type semiconductor on the first surface area and the second surface area; and
   forming the waveguide on and in contact with at least the unremoved portion, the unremoved portion being the element which is the block of material between the first portion of n-type semiconductor material and the second portion of n-type semiconductor material, the element comprising a material for reducing electric current flow from the first portion of n-type semiconductor material to the second portion of n-type semiconductor material during propagation of light via the waveguide.

18. The method of claim 17, wherein at least one of:
the method comprises:
   forming a first PIC component; and
   forming a second PIC component optically connected to the first PIC component by the waveguide, wherein the element is dimensioned and is of a material with an electrical resistivity such that the element at least one of reduces, prevents, or opposes electric current flow between the first PIC component and the second PIC component,
or
the method comprises:
   forming a first PIC component and forming a second PIC component optically connected to the first PIC component by the waveguide, wherein the first PIC component is a photodiode and the second PIC component is a multimode interferometer.

19. The structure of claim 1, wherein at least one of:
the material of the element comprises indium gallium arsenide phosphide doped with a dopant comprising at least one of: iron, ruthenium, vanadium, or titanium;
wherein the material of the element comprises indium gallium arsenide phosphide doped with a dopant comprising at least one of: iron, ruthenium, vanadium, or titanium, the dopant at a concentration from $1e^{16}$ cm$^{-3}$ to $1e^{19}$ cm$^{-3}$; and
the material of the element comprises indium phosphide.

20. A photonic integrated circuit comprising a structure, comprising:
   a substrate;
   a first portion of n-type semiconductor material on a first surface area of the substrate;
   a second portion of n-type semiconductor material on a second surface area of the substrate;
   a waveguide; and
   an element,
wherein:
   the element is a block of material between the first portion and the second portion;
   the element is an integral part of the substrate and is of the same material as the substrate;
   the waveguide is on and in contact with the element; and
   the element is configured to reduce electric current flow from the first portion to the second portion during propagation of light via the waveguide.

* * * * *